US008295216B2

(12) United States Patent
Jokela (10) Patent No.: US 8,295,216 B2
(45) Date of Patent: Oct. 23, 2012

(54) BROADCAST AND MULTICAST TRANSMISSION TECHNIQUES FOR POWERSAVE DEVICES IN WIRELESS NETWORKS

(75) Inventor: Jari Jokela, Ylöjärvi (FI)

(73) Assignee: Nokia Corporation, Espoo (FI)

( * ) Notice: Subject to any disclaimer, the term of this patent is extended or adjusted under 35 U.S.C. 154(b) by 627 days.

(21) Appl. No.: 11/614,498

(22) Filed: Dec. 21, 2006

(65) Prior Publication Data

US 2008/0151814 A1      Jun. 26, 2008

(51) Int. Cl.
*G08C 17/00* (2006.01)
*H04M 1/00* (2006.01)

(52) U.S. Cl. .......................................... 370/311; 455/574
(58) Field of Classification Search .................. 455/574; 370/311
See application file for complete search history.

(56) References Cited

U.S. PATENT DOCUMENTS

| | | | | |
|---|---|---|---|---|
| 6,269,404 | B1 | 7/2001 | Hart et al. ...................... | 709/238 |
| 6,674,738 | B1 | 1/2004 | Yildiz et al. .................... | 370/338 |
| 7,269,152 | B2 | 9/2007 | Vukovic et al. ................ | 370/332 |
| 7,274,929 | B1* | 9/2007 | Banginwar .................... | 455/418 |
| 7,313,111 | B2 | 12/2007 | Hietalahti et al. ............. | 370/329 |
| 7,382,757 | B2 | 6/2008 | LoGalbo et al. ............... | 370/338 |
| 7,522,540 | B1 | 4/2009 | Maufer .......................... | 370/254 |
| 7,916,687 | B2* | 3/2011 | Deshpande et al. ........... | 370/328 |
| 2002/0159407 | A1 | 10/2002 | Carrafiello et al. ............ | 370/328 |
| 2003/0037160 | A1 | 2/2003 | Wall et al. ..................... | 709/233 |
| 2004/0037308 | A1 | 2/2004 | Chen et al. .................... | 370/462 |
| 2004/0160916 | A1 | 8/2004 | Vukovic et al. ................ | 370/332 |
| 2004/0192284 | A1 | 9/2004 | Vaisanen et al. ............. | 455/422.1 |
| 2004/0253948 | A1 | 12/2004 | Laberteaux ................. | 455/422.1 |
| 2004/0264422 | A1 | 12/2004 | Calcev et al. ................. | 370/338 |
| 2005/0009512 | A1 | 1/2005 | Rue ............................... | 455/420 |
| 2005/0080901 | A1 | 4/2005 | Reader .......................... | 709/226 |
| 2005/0141442 | A1 | 6/2005 | Morris et al. ................. | 370/310 |
| 2005/0174953 | A1 | 8/2005 | Ho ................................. | 370/310 |
| 2005/0288069 | A1 | 12/2005 | Arunan et al. ................ | 455/574 |
| 2006/0083200 | A1 | 4/2006 | Emeott et al. ................ | 370/331 |
| 2006/0098613 | A1 | 5/2006 | Kish et al. ..................... | 370/338 |
| 2006/0126533 | A1 | 6/2006 | Wang ............................ | 370/254 |
| 2006/0165031 | A1 | 7/2006 | Wang et al. ................... | 370/328 |
| 2006/0166699 | A1 | 7/2006 | Aghvami et al. ........... | 455/552.1 |

(Continued)

FOREIGN PATENT DOCUMENTS

EP      1 463 242 A2      9/2004

(Continued)

OTHER PUBLICATIONS

Meylan, Arnaud et al., "Standby Time Improvements", IEEE 802.11-06/0636r1, (May 16, 2006).

(Continued)

*Primary Examiner* — Marisol Figueroa
(74) *Attorney, Agent, or Firm* — Harrington & Smith (57) ABSTRACT

Various embodiments are described relating to determining delivery intervals in a wireless network, such as an 802.11 infrastructure network. In an example embodiment, a first negotiated delivery interval for a first wireless node may be negotiated by a transmitting wireless node in a wireless network based on a multicast service setup operation and a Delivery Traffic Indication Map (DTIM) interval. Information may be sent from the transmitting wireless node to the first wireless node based on the first negotiated delivery interval. According to an example embodiment, the first negotiated delivery interval may include an integer multiple number of DTIM intervals.

23 Claims, 9 Drawing Sheets

U.S. PATENT DOCUMENTS

| | | | | |
|---|---|---|---|---|
| 2006/0187864 | A1* | 8/2006 | Wang et al. | 370/311 |
| 2006/0229061 | A1 | 10/2006 | Chaplin | 455/411 |
| 2007/0087767 | A1 | 4/2007 | Pareek et al. | 455/502 |
| 2007/0104199 | A1 | 5/2007 | Taha | 370/392 |
| 2007/0291681 | A1 | 12/2007 | Jokela | 370/328 |
| 2007/0291725 | A1 | 12/2007 | Kowalski | 370/338 |
| 2007/0297438 | A1* | 12/2007 | Meylan et al. | 370/445 |
| 2008/0062948 | A1* | 3/2008 | Ponnuswamy | 370/342 |
| 2008/0194201 | A1 | 8/2008 | Sinivaara et al. | 455/41.2 |

FOREIGN PATENT DOCUMENTS

| | | |
|---|---|---|
| EP | 1 684 467 | 7/2006 |
| EP | 1684465 A1 | 7/2006 |
| EP | 1684466 A1 | 7/2006 |
| KR | 20050065123 | 6/2005 |
| WO | WO 2004/029770 A2 | 4/2004 |
| WO | WO 2005/076544 A1 | 8/2005 |
| WO | WO 2007/052137 A2 | 5/2007 |
| WO | 2008/081277 A3 | 8/2008 |

OTHER PUBLICATIONS

Jokela, Jari et al., "Broadcast and Multicast Enhancements", IEEE 802.11-06/0947r0, pp. 1-18, (Jul. 18, 2006).

Jokela, Jari et al., "Broadcast and Multicast Enhancements", IEEE 802.11-06/1030r1, (Jul. 18, 2006).

IEEE P802.11v/D0.05, Draft to Standard for Information Technology—Telecommunications and Information Exchange Between Systems—LAN/MAN Specific Requirements—Part 11: Wireless Medium Access Control (MAC) and physical layer (PHY) Specifications, pp. 1-158, (Sep. 2006).

Acquaviva, A et al., "A Methodology Based on Formal Methods for Predicting the Impact of Dynamic Power Management", http://www.sti.uniurb.it/bonta/book_chapters/sfm05moby_01.pdf, Formal Methods for Mobile Computing, M. Bernardo and A. Bogliolo editors, Lecture Notes in Computer Science 3465, pp. 155-189, (Apr. 2005).

Bonta, E et al., "Synthesizing Concurrency Control Components from Process Algebraic Specifications", http://www.sti.uniurb.it/bonta/conference_papers/coordination2006.pdf, roc. of the 8th Int. Conf. on Coordination Models and Languages (Coordination 2006), P. Ciancarini and H. Wiklicky editors, Lecture Notes in Computer Science 4038, pp. 28-43, (Jun. 2006).

Bernardo, M et al., "Predicting the Functional/Performance Impact of Dynamic Power Management", http://www.sti.uniurb.it/bonta/conference_papers/pmccs2005.pdf, Proc. of the 7th Int. Workshop on Performability Modeling of Computer and Communication Systems (PMCCS 7), pp. 10-13, (Sep. 2005).

Bernardo, M et al., "Preserving Architectural Properties in Multithreaded Code Generation", http://www.sti.uniurb.it/bonta/conference_papers/coordination2005.pdf, Proc. of the 7th Int. Conf. on Coordination Models and Languages (Coordination 2005), J.-M. Jacquet and G.P. Picco editors, Lecture Notes in Computer Science 3454, pp. 188-203, (Apr. 2005).

Acquaviva, A et al., "Assessing the Impact of Dynamic Power Management on the Functionality and the Performance of Battery-Powered Appliances", http://www.sti.uniurb.it/bonta/conference_papers/dsn2004.pdf, Proc. of the 5th IEEE/IFIP Int. Conf. on Dependable Systems and Networks (DSN 2004), IEEE-CS Press, pp. 731-740, (Jun. 2004).

Bernardo, M et al., "Generating Well-Synchronized Multithreaded Programs from Software Architecture Descriptions", http://www.sti.uniurb.it/bonta/conference_papers/wicsa2004_new.pdf, Proc. of the 4th Working IEEE/IFIP Conf. on Software Architecture (WICSA 2004), J. Magee, C. Szyperski, and J. Bosch editors, IEEE-CS Press, pp. 167-176, (Jun. 2004).

Acquaviva, A et al., "Dynamic Power Management Strategies Within the IEEE 802.11 Standard" <http://www.sti.uniurb.it/bonta/book_chapters/sfm05moby_02.pdf>, in Formal Methods for Mobile Computing, M. Bernardo and A. Bogliolo editors, Lecture Notes in Computer Science 3465:190-214, (Apr. 2005).

Meylan, Arnaud et al., "Normative Text Proposal for TGv", IEEE 802.11-06/0489r01, (Mar. 2006).

A. Acquaviva, E. Bantà, and E. Lattanzi, "Dynamic Power Management Strategies Within the IEEE 802.11 Standard", in Formal Methods for Mobile Computing, M. Bernardo and A. Bogliolo editors, Lecture Notes in Computer Science 3465:190-214, Apr. 2005.

IEEE P802.11 Wireless LANs, "Introduce a Management TIM in addition to the existing DTIM for broadcast/multicast mechanism", by Arnaud Meylan and Sanjiv Nanda, pp. 1-24, May 16, 2006.

IEEE P802.11v™/D0.03 "Draft Amendment to Standard for Information Technology—Telecommunications and Information Exchange Between Systems—LAN/MAN Specific Requirements—Part 11: Wireless Medium Access Control (MAC) and physical layer (PHY) specifications Amendment v: Wireless Network Management" Prepared by the IEEE 802.11 Working Group of the IEEE 802 Committee, pp. 1-250, Copyright © 2006 by the Institute of Electrical and Electronics Engineers, Inc.

Jokela, J., "CID 186 and 211 Normative Text", Wireless LANs, IEEE 802.11-07/0066r1 (Jan. 15, 2007), pp. 1-7.

Jokela, J., et al, "Broadcast and Multicast Enhancements", IEEE 802.11-06/1030 r0 (Jul. 18, 2006), pp. 1-13.

Meylan, A., et al, "Normative Text Proposal for TGv", Wireless LANs, IEEE 802.11-06/0489r01 (May 16, 2006), pp. 1-12.

"Enhanced Power-Saving Mechanism for Broadcast and Multicast Service in WLAN" Hyu-Dae Kim and Dong-Ho Cho, IEEE Communications Letters. vol. 9, No. 6 Jun. 2005.

"An Energy Efficient MAC Protocol for Wireless LAN's" Eun-Sun Jung and Nitin H. Vaidya, Twenty-First Annual Joint Conference of the IEEE Computer and Communications Societies Proceedings. IEEE Vo. 3 2002 se p. 1756-1759; abstract.

"Broadcast and Multicast Enhancements" Jari Jokela, Doc: IEEE 802.11-05/1075r0, Nov. 2005—http://www.ieee802.org/11/DocFiles/05/—see slides 15-16.

"Power Management Modeling and Optimal Policy for IEEE 802.11 WLAN Systems" Huan Chen amd Cheng-Wei Huang, Vehicular Technology Conference, 2004 vol. 6; Sep. 26-29, 2004 see pp. 4416-4418; p. 4420; abstract.

* cited by examiner

| Octets: 1 | 1 | 1 | variable | ... | variable |
|---|---|---|---|---|---|
| Element ID | Length | Multicast Element Count | FBMS Element 1 | ... | FBMS Element n |

| Octets: variable | variable | variable | 3 | 1 | variable |
|---|---|---|---|---|---|
| TCLAS IE | Optional TCLAS IE | Optional TCLAS IE | Optional TCLAS Processing IE | Delivery Interval | FBMS Element n |

| Octets: 1 | 1 | 5 | ... | 5 |
|---|---|---|---|---|
| Element ID | Length | FBMS Status Element 1 | ... | FBMS Status Element n |

| Octets: 1 | 1 | 1 | 1 | 1 |
|---|---|---|---|---|
| Element Status | Delivery Interval | Element Reason Code | FBMSID | FBMS Counter ID |
| | 902 | 908 | 904 | 906 |

| Bits: 1 | 1 | 1 | 1 | 1 | 1 | 11 |
|---|---|---|---|---|---|---|
| Event Log | Diagnostics | Multicast Alert | Presence | FBMS | Proxy ARP Service | Reserved |
| B0 | B1 | B2 | B3 | B4 | B5 | B6 ... B15 |

1002 (points to B4/FBMS)

| Octets: 1 | 1 | 1 | 1 | ... | 1 | 1 | ... | 1 |
|---|---|---|---|---|---|---|---|---|
| Element ID | Length | Number Of FBMS Counters | FBMS Counter #1 | ... | FBMS Counter #n | FBMSID | ... | FBMSID |

1102 (FBMS Counter #1)
1104 (FBMSID)

FIG. 12

BROADCAST AND MULTICAST TRANSMISSION TECHNIQUES FOR POWERSAVE DEVICES IN WIRELESS NETWORKS

BACKGROUND

The rapid diffusion of Wireless Local Area Network (WLAN) access and the increasing demand for WLAN coverage is driving the installation of a very large number of Access Points (AP). The most common WLAN technology is described in the Institute of Electrical and Electronics Engineers IEEE 802.11 family of industry specifications, such as specifications for IEEE 802.11b, IEEE 802.11g and IEEE 802.11a. A number of different 802.11 task groups are involved in developing specifications relating to improvements to the existing 802.11 technology. The IEEE 802.11v task group has developed a Wireless Network Management draft specification, entitled "Standard for Information Technology—Telecommunications and Information Exchange Between Systems—LAN/MAN Specific Requirements, Part 11: Wireless Medium Access Control (MAC) and physical layer (PHY) specifications, Amendment v: Wireless Network Management," IEEE 802.11v.D0.03, May 2006.

As another example, some wireless networks are based upon the Distributed Medium Access Control (MAC) for Wireless Networks industry specifications of the WiMedia Alliance, for example. For example, the WiMedia network protocol adaptation (WiNet) layer is a protocol adaptation layer (PAL) that builds on a WiMedia ultra-wideband (UWB) common radio platform to augment the convergence platform with TCP/IP services. A number of working groups are working to improve on this technology.

An example standard, for example, the Distributed Medium Access Control (MAC) for Wireless Networks of the WiMedia Alliance, defines a distributed medium access control (MAC) sublayer for wireless networks, and further specifies a wireless network structure that does not require an existing infrastructure for communication such as, for example, a WiMedia ultra-wideband (UWB) network.

Categories of example applications considered for such an example standard may include portable electronic devices intended to be carried by a user, home electronics equipment, and personal computers and peripherals. Example portable electronic devices may have specific requirements to support mobility and good power efficiency. Devices such as home electronics and computers may not be as mobile, and not as sensitive to power efficiency as such portable electronic devices.

With efficient power management great savings can be achieved in infrastructure networks. Traffic for mobile stations may pass through access points, so the access points provide ideal locations to buffer traffic. Access points may be aware of associated mobile stations, and a mobile station may communicate its power management state to its access point. Furthermore, access points may remain active at all times; thus access points may play a key role in power management on infrastructure networks. An access point may know the power management state of every station that has associated with it, and thus the access point may determine whether a frame should be delivered to the wireless network because the station is active, or whether the frame should be buffered because the station is in a powersave state. In order to enable mobile stations to receive the data waiting for them, an access point may announce periodically which stations have frames waiting for them. The periodic announcement of buffer status may also contribute to the power savings in infrastructure networks, as powering up a receiver to listen to the buffer status may require far less power than periodically transmitting polling frames. Thus, a station may only need to power up the transmitter to transmit polling frames after being informed that there is a reason to expend the energy.

A conventional IEEE 802.11 network may, for example, provide a fixed power save scheme to be used by broadcast and different multicast services. The scheme may, for example, define a fixed listen interval for stations (STAs) or mobile stations in the network. For example, an access point (AP) may buffer all the broadcast and multicast traffic and after a specific Delivery Traffic Indication Map (DTIM) beacon frame (e.g., a DTIM may be included in every nth beacon frame) the AP may automatically deliver all the buffered broadcast and multicast traffic. However, different broadcast and multicast services may have very different service characteristics, and thus having only one static scheme in a wireless local area network (WLAN) level may provide little flexibility. Example services may vary from basic broadcast services such as Address Resolution Protocol (ARP) or Dynamic host Configuration Protocol (DHCP), which may have low bit rates (e.g., needing a long listen interval), to different multicast streaming services (e.g., audio, video, etc.) having high bit rate requirements (e.g., needing a shorter listen interval).

However, current fixed schemes may provide only a single bit (e.g., an association identifier (AID) 0 bit in a TIM field) for an AP to indicate the existence of buffered broadcast and/or multicast data. Thus, a receiving STA may not know whether the buffered data is broadcast or multicast, and more particularly the STA may not know whether the buffered data is associated with a multicast service for which the STA desires to receive the data. Thus, the STA may need to switch to an awake state and receive data, even when the data is not intended for this particular STA, thus consuming energy to receive unneeded data.

Techniques for determining flexible configurations for broadcast and multicast transmission may thus advantageously improve performance of stations receiving broadcast and/or multicast information.

SUMMARY

Various embodiments are described relating to determining delivery intervals in a wireless network.

According to an example embodiment, a first negotiated delivery interval for a first wireless node may be negotiated by a transmitting wireless node in a wireless network based on a multicast service setup operation and a Delivery Traffic Indication Map (DTIM) interval. Information may be sent from the transmitting wireless node to the first wireless node based on the first negotiated delivery interval. According to an example embodiment, the first negotiated delivery interval may include an integer multiple number of DTIM intervals.

According to another example embodiment, a first negotiated delivery interval may be negotiated with a transmitting wireless node by a first wireless node in a wireless network based on a multicast service setup operation and a Delivery Traffic Indication Map (DTIM) interval. Information may be received from the transmitting wireless node by the first wireless node based on the first negotiated delivery interval.

In another example embodiment, an apparatus for wireless communications may include a controller, a memory coupled to the controller, and a wireless transceiver coupled to the controller. The apparatus may be adapted to negotiate a first negotiated delivery interval for a first wireless node in a wireless network based on a multicast service setup operation and a Delivery Traffic Indication Map (DTIM) interval, and send information to the first wireless node based on the first negotiated delivery interval.

In another example embodiment, an apparatus for wireless communications may include a controller, a memory coupled to the controller, and a wireless transceiver coupled to the controller. The apparatus may be adapted to negotiate with a transmitting wireless node in a wireless network a first negotiated delivery interval based on a multicast service setup operation and a Delivery Traffic Indication Map (DTIM) interval, and receive information from the transmitting wireless node based on the first negotiated delivery interval.

DETAILED DESCRIPTION

Figure 1:
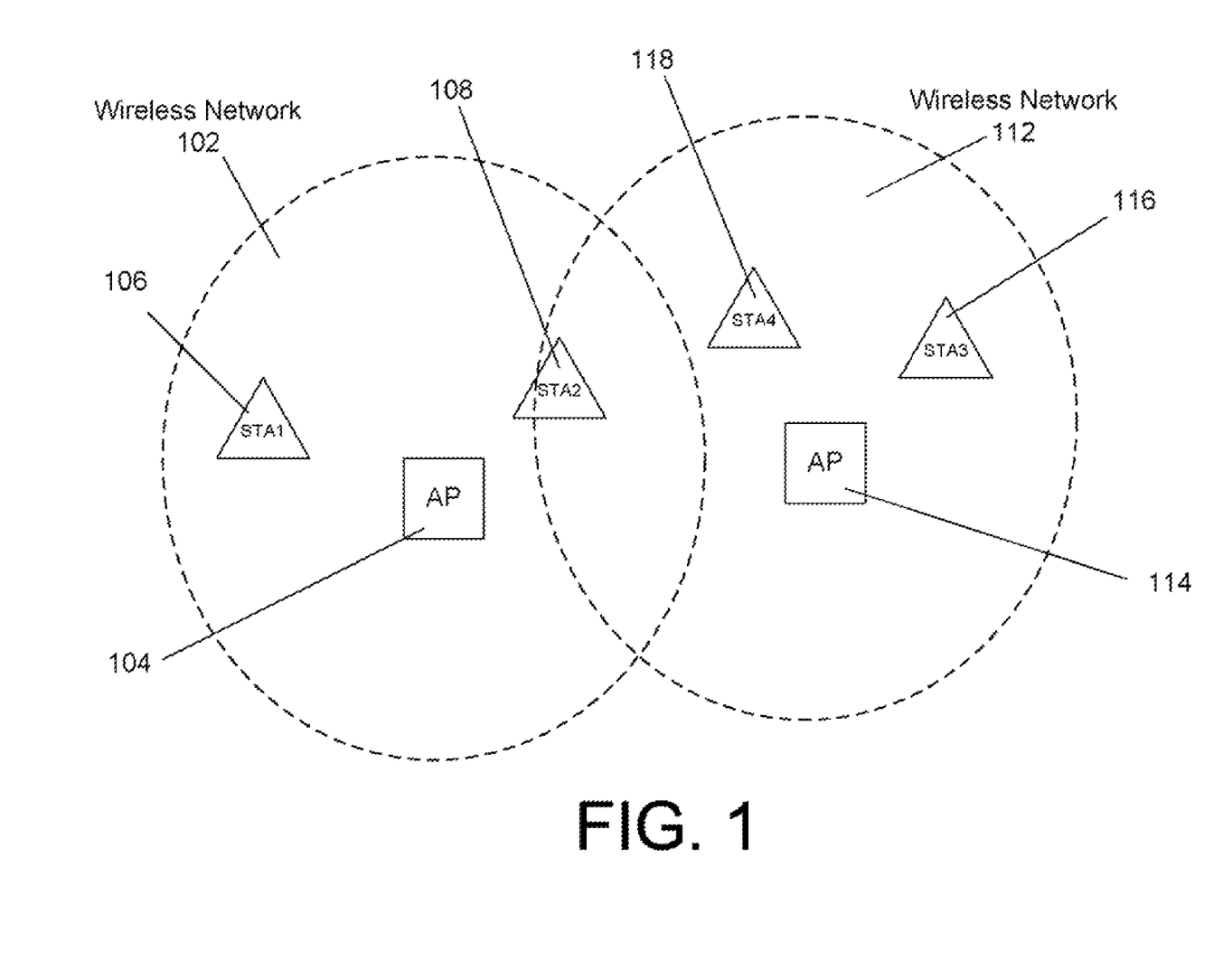
FIG. 1 is a diagram of an example configuration of a wireless network according to an example embodiment.

Referring to the Figures in which like numerals indicate like elements, FIG. 1 is a diagram illustrating wireless networks 102 and 112 according to an example embodiment. According to an example embodiment, a wireless network, such as wireless network 102 and wireless network 112 may each include a number of wireless nodes, such as mobile stations, Access Points (APs), base stations, etc.

According to an example embodiment, each wireless network may include an Access Point (AP) and one or more mobile stations that may be in communication with the AP. For example, as shown in FIG. 1, wireless network 102 may include an AP 104 and several mobile stations that may be in communication with AP 104, such as mobile station STA1 106 and mobile station STA2 108. Similarly, wireless network 112 may include AP 114 and several mobile stations that may be in communication with AP 114, such as mobile station STA3 116 and mobile station STA4 118. Although not shown, AP 102 and AP 112 may be coupled to a fixed network.

The various embodiments described herein may be applicable to a wide variety of networks and technologies, such as WLAN networks (e.g., IEEE 802.11 type networks), cellular networks, radio networks, or other wireless or wired networks. In another example embodiment, the various examples and embodiments may be applied to a meshed wireless network, where a plurality of mesh points (e.g., Access Points) may be coupled together via wired or wireless links. The term "node" or "wireless node" or "network node" or "network station" may refer, for example, to a wireless station, e.g., a subscriber station or mobile station, an access point or base station, a relay station or other intermediate wireless node, or other wireless computing devices, such as laptop computers, desktop computers, and peripheral devices, as examples. The term "listen interval" or "delivery interval" may refer, for example, to a duration of an interval during which a wireless station may remain awake to receive information, for example, from an AP. For example, the wireless station may remain awake during a listen interval or delivery interval to receive multicast data from the AP. The term "DTIM period" or "DTIM interval" may refer, for example, to a number of beacons transmitted between DTIMs, or beacons that include a Delivery Traffic Indication Map (DTIM).

Figure 2:
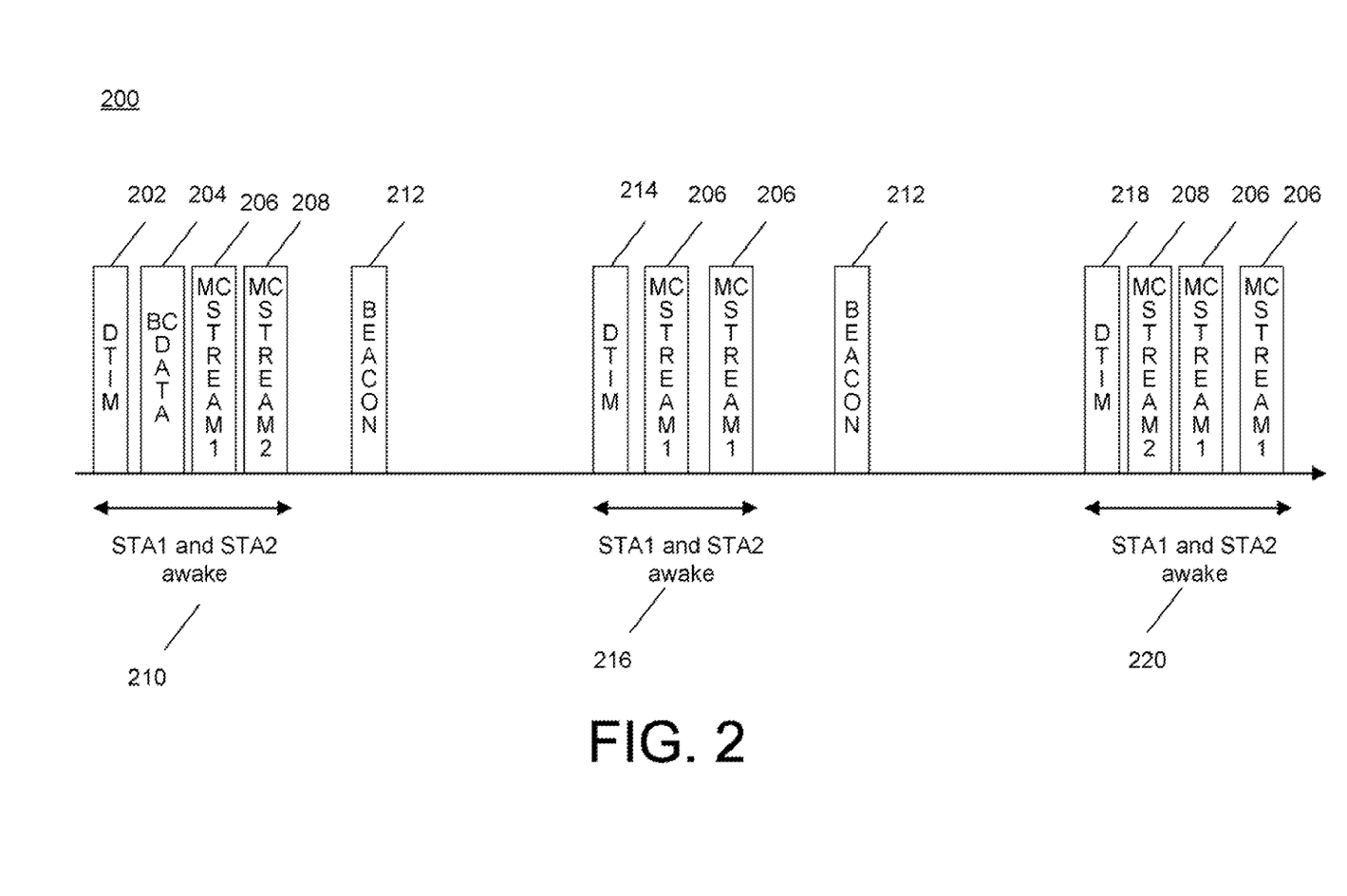
FIG. 2 is a diagram illustrating transmission of information on a medium in a wireless network.

FIG. 2 is a diagram illustrating transmission of information on a medium in a wireless network. For example, the AP 104 may transmit information to the STA1 106 and the STA2 108. For example, the AP 104 may transmit a Delivery Traffic Indication Map (DTIM) 202. The DTIM 202 may be followed by broadcast data 204. The broadcast data 204 may be followed by a multicast stream1 206 directed at least to the STA1 106, and a multicast stream2 208 directed at least to the STA2 108. For the example of FIG. 2, no negotiation of listen intervals or delivery intervals is performed, and thus, the STA1 106 and STA2 108 awaken for the DTIM 202 and remain awake for the entire transmission 210.

A beacon 212 is then transmitted. The AP 104 may then transmit a DTIM 214. Thus, for this particular example, a DTIM period may be considered to be 2 beacon periods. The DTIM 214 may be followed by two intervals of the multicast stream1 206 directed at least to the STA1 106. Again, the STA1 106 and STA2 108 awaken for the DTIM and remain awake for the entire transmission 210.

A beacon 212 is then transmitted. The AP 104 may then transmit a DTIM 218. The DTIM 218 may be followed by one interval of the multicast stream2 208 directed at least to the STA2 108 and two intervals of the multicast stream1 206 directed at least to the STA1 106. Again, the STA1 106 and STA2 108 awaken for the DTIM and remain awake for the entire transmission 210. Thus, STA2 108 awakens, and remains awake, for transmissions of the multicast stream1 206 which is not intended for the STA2 108. Similarly, the STA1 106 unnecessarily remains awake for the interval of the multicast stream2 208 data following the DTIM 202.

Figure 3:
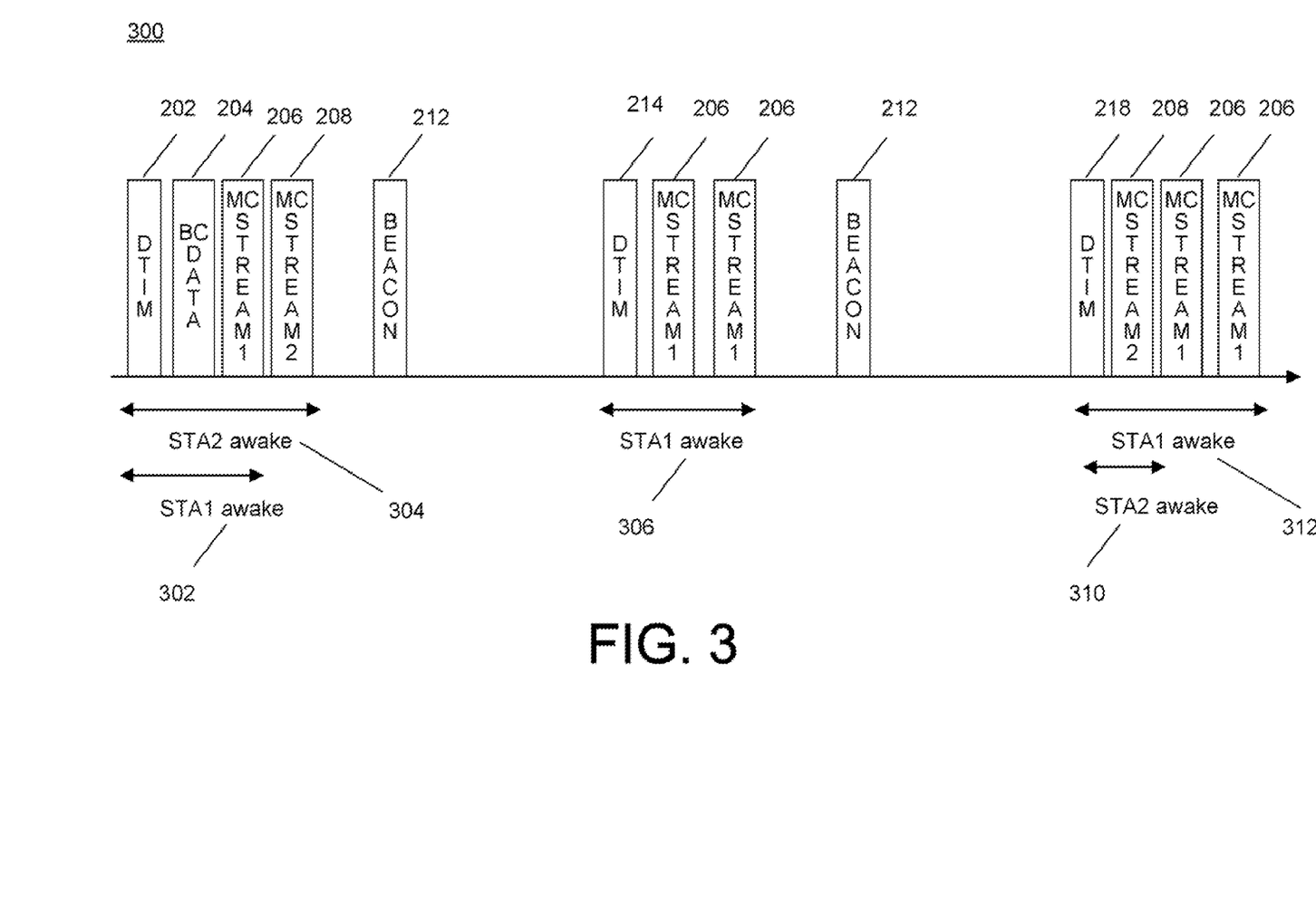
FIG. 3 is a diagram illustrating operation of transmission of information on a medium in a wireless network according to an example embodiment.

FIG. 3 is a diagram illustrating operation of transmission of information on a medium in a wireless network according to an example embodiment. For the example of FIG. 3, a negotiation of a listen interval or delivery interval is performed between the STA1 106 and the STA2 108 and the AP 104. For example, the AP 104 may agree to send requested multicast data intended for STA1 104 and STA2 108 during specific DTIM periods or DTIM intervals. Similarly as shown in FIG. 2, the AP 104 may transmit the Delivery Traffic Indication Map (DTIM) 202. The DTIM 202 may be followed by broadcast data 204. The broadcast data 204 may be followed by a multicast stream1 206 directed at least to the STA1 106, and a multicast stream2 208 directed at least to the STA2 108. For the example of FIG. 3, since the negotiation of listen intervals or delivery intervals is performed, the STA1 106 awakens for the DTIM 202 and remains awake for the transmission 302, long enough to receive the broadcast data 204 and the multicast stream1 206. The STA2 108 awakens for the DTIM 202 and remains awake for the transmission 304, long enough to receive the broadcast data 204 and the multicast stream2 208.

A beacon 212 is then transmitted. The AP 104 may then transmit the DTIM 214. The DTIM 214 may be followed by two intervals of the multicast stream1 206 directed at least to the STA1 106. For the example of FIG. 3, since the negotiation of listen intervals or delivery intervals is performed, the STA1 106 awakens for the DTIM 214 and remains awake for the transmission 306, long enough to receive the two intervals of the multicast stream1 206 directed at least to the STA1 106. The STA2 108 may remain in powersave mode since no data is transmitted that is directed at least to the STA2 108 during the transmission 306. Thus, the STA2 108 may remain in powersave mode as a result of the delivery interval being negotiated such that the STA2 108 does not have to be awake to receive the DTIM 214. Thus, for the example of FIG. 3, the negotiated delivery interval may be 1 for the STA1 106, and the negotiated delivery interval may be 2 for the STA2 108.

A beacon 212 is then transmitted. The AP 104 may then transmit the DTIM 218. The DTIM 218 may be followed by one interval of the multicast stream2 208 directed at least to the STA2 108 and two intervals of the multicast stream1 206 directed at least to the STA1 106. For the example of FIG. 3, since the negotiation of listen intervals or delivery intervals is performed, the STA1 106 and STA2 108 awaken for the DTIM and may remain awake long enough to receive each station's multicast data. Thus, STA2 108 awakens, and remains awake, for transmission 310 of the multicast stream2 208. Similarly, the STA1 106 remains awake for the interval 312 of the multicast stream2 208 data and the two intervals of the multicast stream1 206. Therefore, the STA1 106 and STA2 108 may be able to receive information over longer intervals, and may sleep for longer intervals. Moreover, the STA1 106 and STA2 108 may receive broadcast data and multicast services at different listen intervals or delivery intervals.

Figure 4:
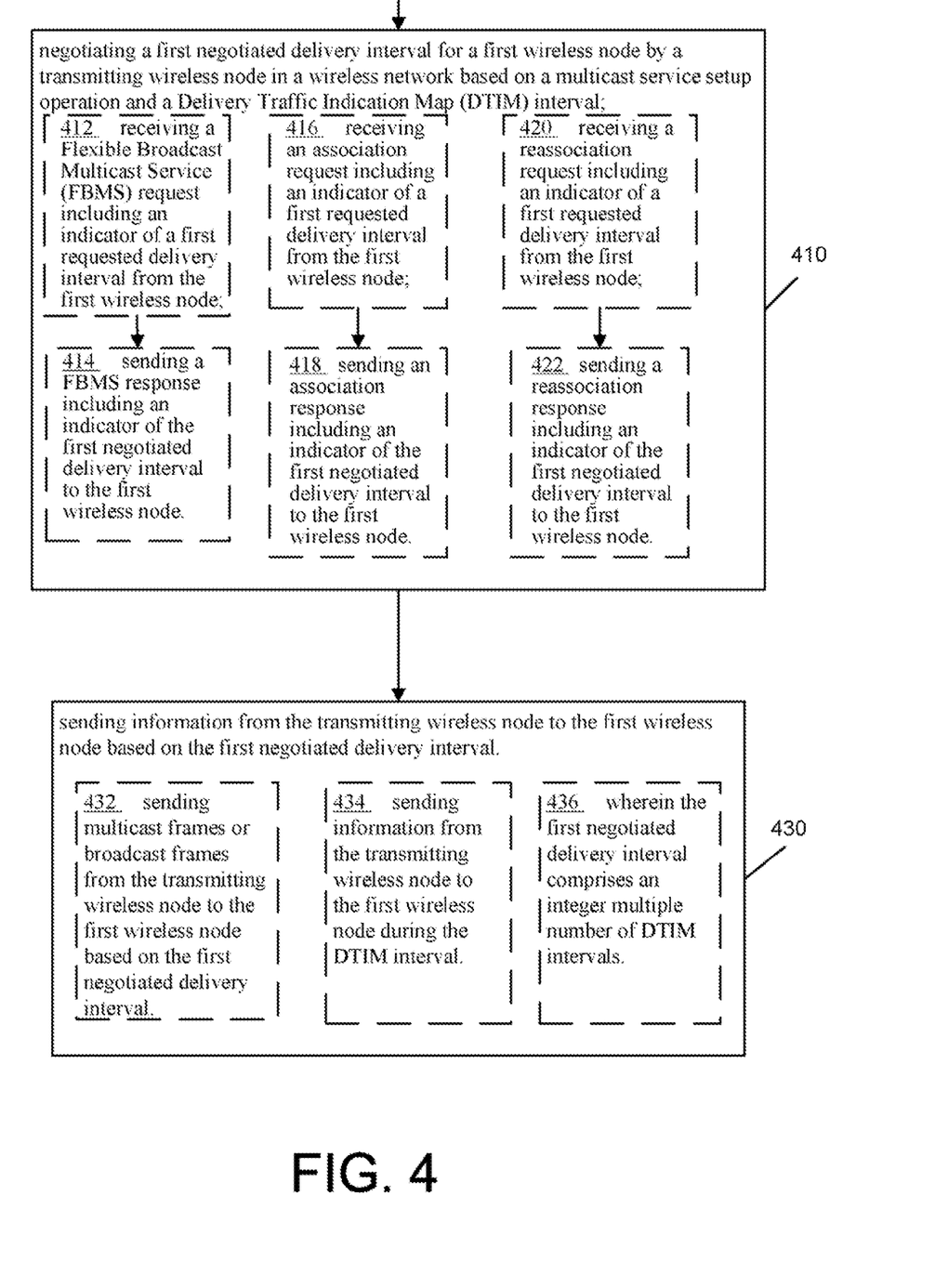
FIG. 4 is a flow chart illustrating example operations of an example transmitting node according to an example embodiment.

FIG. 4 is a flow chart illustrating example operations of an example transmitting node according to an example embodiment. A first negotiated delivery interval for a first wireless node may be negotiated by a transmitting wireless node in a wireless network based on a multicast service setup operation and a Delivery Traffic Indication Map (DTIM) interval (410). For example, the first negotiated delivery interval for the STA1 106 may be negotiated by the AP 104 based on a multicast service setup operation and a DTIM interval, for example, the DTIM interval between DTIM 202 and DTIM 214. For example, the DTIM interval between DTIM 202 and DTIM 214 is 2, as shown in the example of FIG. 3.

According to an example embodiment, a Flexible Broadcast Multicast Service (FBMS) request including an indicator of a first requested delivery interval may be received from the first wireless node (412). For example, the AP 104 may receive a FBMS request from the STA1 106 including an indicator of a first requested delivery interval. For example, the first requested delivery interval may be included in the DTIM interval between DTIM 202 and DTIM 214.

According to an example embodiment, a FBMS response including an indicator of the first negotiated delivery interval may be sent to the first wireless node (414). For example, the AP 104 may send a FBMS response to the STA1 106 including an indicator of the first negotiated delivery interval. For example, the first negotiated delivery interval may be included in the DTIM interval between DTIM 202 and DTIM 214.

According to an example embodiment, an association request including an indicator of a first requested delivery interval may be received from the first wireless node (416). For example, an association request including an indicator of a first requested delivery interval may be received from the STA1 106. For example, the first requested delivery interval may be included in the DTIM interval between DTIM 202 and DTIM 214.

An association response including an indicator of the first negotiated delivery interval may be sent to the first wireless node (418). For example, the AP 104 may send an association response including an indicator of the first negotiated delivery interval to the STA1 106.

According to an example embodiment, a reassociation request including an indicator of a first requested delivery interval may be received from the first wireless node (420). For example, the first requested delivery interval may be included in the DTIM interval between DTIM 202 and DTIM 214. According to an example embodiment, a reassociation response including an indicator of the first negotiated delivery interval may be sent to the first wireless node (422).

According to an example embodiment, information may be sent from the transmitting wireless node to the first wireless node based on the first negotiated delivery interval (430). For example, the AP 104 may send information to the STA1 106 based on the first negotiated delivery interval. For example, the AP 104 may send information to the STA1 106 in the DTIM interval between DTIM 202 and DTIM 214.

According to an example embodiment, multicast frames or broadcast frames may be sent from the transmitting wireless node to the first wireless node based on the first negotiated delivery interval (432). For example, the AP 104 may send multicast frames or broadcast frames to the STA1 106 based on the first negotiated delivery interval. For example, the AP 104 may send multicast frames or broadcast frames to the STA1 106 in the DTIM interval between DTIM 202 and DTIM 214.

According to an example embodiment, information may be sent from the transmitting wireless node to the first wireless node during the DTIM interval (434). For example, the AP 104 may send information to the STA1 106 in the DTIM interval between DTIM 202 and DTIM 214.

According to an example embodiment, the first negotiated delivery interval may include an integer multiple number of DTIM intervals (436). For example, the listen interval may include six beacon intervals.

Figure 5:
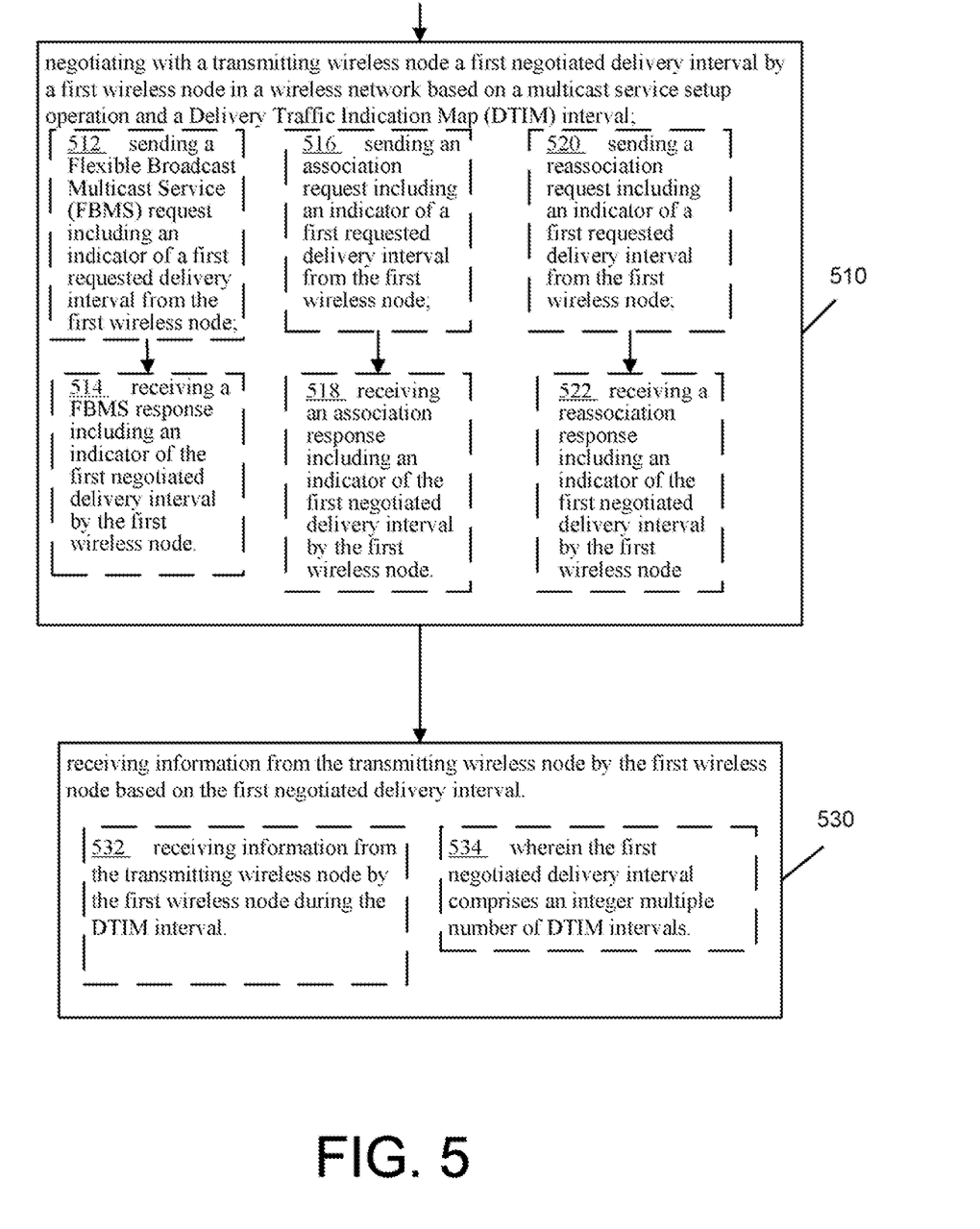
FIG. 5 is a flow chart illustrating example operations of an example receiving node according to an example embodiment.

FIG. 5 is a flow chart illustrating example operations of an example receiving node according to an example embodiment. A first negotiated delivery interval for a first wireless node may be negotiated with a transmitting wireless node by a first wireless node in a wireless network based on a multicast service setup operation and a Delivery Traffic Indication Map (DTIM) interval (51 0). For example, the first negotiated delivery interval for the STA1 106 may be negotiated by the STA1 106 with the AP 104 based on a multicast service setup operation and a DTIM interval, for example, the DTIM interval between DTIM 202 and DTIM 214.

According to an example embodiment, a Flexible Broadcast Multicast Service (FBMS) request including an indicator of a first requested delivery interval may be sent from the first wireless node (512). For example, the STA1 106 may send the AP 104 a FBMS request including an indicator of a first requested delivery interval. For example, the first requested delivery interval may be included in the DTIM interval between DTIM 202 and DTIM 214.

According to an example embodiment, a FBMS response including an indicator of the first negotiated delivery interval may be received by the first wireless node (514). For example, to the STA1 106 may receive a FBMS response including an indicator of the first negotiated delivery interval from the AP 104. For example, the first negotiated delivery interval may be included in the DTIM interval between DTIM 202 and DTIM 214.

According to an example embodiment, an association request including an indicator of a first requested delivery interval may be sent from the first wireless node (516). For example, an association request including an indicator of a first requested delivery interval may be sent from the STA1 106. For example, the first requested delivery interval may be included in the DTIM interval between DTIM 202 and DTIM 214.

An association response including an indicator of the first negotiated delivery interval may be received by the first wireless node (518). For example, the STA1 106 may receive an association response including an indicator of the first negotiated delivery interval.

According to an example embodiment, a reassociation request including an indicator of a first requested delivery interval may be sent from the first wireless node (520). For example, the first requested delivery interval may be included in the DTIM interval between DTIM 202 and DTIM 214. According to an example embodiment, a reassociation response including an indicator of the first negotiated delivery interval may be received by the first wireless node (522).

According to an example embodiment, information may be received from the transmitting wireless node by the first wireless node based on the first negotiated delivery interval (530). For example, the AP 104 may send information to the STA1 106 based on the first negotiated delivery interval. For example, the STA1 106 may receive information from the AP 104 in the DTIM interval between the DTIM 202 and DTIM 214.

According to an example embodiment, information may be received from the transmitting wireless node by the first wireless node during the DTIM interval (532). For example, information may be received from the AP 104 by the STA1 106 in the DTIM interval between the DTIM 202 and DTIM 214.

According to an example embodiment, the first negotiated delivery interval may include an integer multiple number of DTIM intervals (534). For example, the first negotiated delivery interval may include six beacon intervals.

Thus, for example, the STA1 106 may be allowed to sleep for longer intervals, as the delivery interval is negotiated with the AP 104, and thus, the STA1 106 may not need to awake and remain awake for intervals during which, for example, multicast data is transmitted that is not addressed to the STA1 106.

Power management may provide great savings in infrastructure networks. Traffic for mobile stations may pass through access points, so the access points may be located in an ideal location to buffer traffic. Access points may be aware of associated mobile stations, and a mobile station may communicate its power management state to its access point. Furthermore, access points may remain active at all times; thus access points may play a key role in power management on infrastructure networks. An access point may know the power management state of every station that has associated with it, and thus the access point may determine whether a frame should be delivered to the wireless network because the station is active, or whether the frame should be buffered because the station is in a powersave state. In order to enable mobile stations to receive the data waiting for them, an access point may announce periodically which stations have frames waiting for them. The periodic announcement of buffer status may also contribute to the power savings in infrastructure networks, as powering up a receiver to listen to the buffer status may require far less power than periodically transmitting polling frames. Thus, a station may only need to power up the transmitter to transmit polling frames after being informed that there is a reason to expend the energy.

Many conventional power management techniques have been designed around the needs of battery-powered mobile stations. Mobile stations can sleep for extended periods to avoid using the wireless network interface. For example, an association request may include a listen interval or delivery interval parameter, which includes the number of beacon periods for which the mobile station may choose to sleep. Longer listen intervals or delivery intervals may require more buffer space on the access point; therefore, the listen interval or delivery interval may be used in estimating the resources required to support an association. The listen interval or delivery interval may, for example, be viewed as a contract with the access point. In agreeing to buffer any frames while the mobile station is sleeping, the access point agrees to wait for at least the listen interval or delivery interval before discarding frames. If a mobile station fails to check for waiting frames after each listen interval or delivery interval, such frames may be discarded without notification.

When frames are buffered, a destination node's association ID (AID) may provide a logical link between the frame and its destination. The AID, for example, may indicate a terminals or station for which buffered data exists at an access point. Each AID may thus be logically connected to frames buffered for a mobile station that is assigned that AID. Multicast and broadcast frames may be buffered and linked to an AID of zero. To inform stations that frames are buffered, access points may, for example, periodically assemble a traffic indication map (TIM) and transmit it in beacon frames. The TIM may be formatted, for example, as a virtual bitmap including 2,008 bits; offsets are used so that the access point needs to transmit only a small portion of the virtual bitmap. This example technique may conserve network capacity when only a few stations have buffered data. Each bit in the TIM may correspond to a particular AID; setting the bit may indicate that the access point has buffered unicast frames for the station with the AID corresponding to the bit position.

Access points may retain frames long enough for mobile stations to retrieve them, but buffer memory is a finite resource. Thus, access points may use an aging function to determine when buffered frames are old enough to be discarded. Mobile stations may depend on access points to buffer traffic for at least the listen interval specified with the association, and an aging function may not discard frames before the listen interval has elapsed.

Frames with a group address may not be delivered using a polling algorithm because they are addressed to a group. Therefore, a mechanism for buffering and delivering broadcast and multicast frames may be provided. Buffering may be identical to the unicast case, except that frames may be buffered whenever any station associated with the access point is sleeping. Buffered broadcast and multicast frames may be saved using AID 0. Access points may then indicate whether any broadcast or multicast frames are buffered by setting the first bit in the TIM to 0; this bit corresponds to AID 0. Each BSS may be associated with a parameter referred to as a Delivery Traffic Indication Map (DTIM) Period.

TIMs may be transmitted with every beacon. At a fixed number of beacon intervals, a special type of TIM, the Delivery Traffic Indication Map (DTIM), may be sent. The TIM element in beacon frames may include a counter that counts down to the next DTIM; this counter is zero in a DTIM frame. According to example techniques, buffered broadcast and multicast traffic may be transmitted after a DTIM Beacon. Multiple buffered frames may be transmitted in sequence; a More Data bit in the Frame Control field may indicate that more frames need to be transmitted.

The access point may choose to defer the processing of incoming PS-Poll frames until the frames in the broadcast and multicast transmission buffers have been transmitted. In order to receive broadcast and multicast frames, a mobile station may need to be awake for DTIM transmissions. Thus, powersaving stations in infrastructure networks may wake up or awaken to listen to DTIM frames. Some devices that implement power-saving modes may thus attempt to align their awakenings with DTIM transmissions. If, for example, a system administrator determines that conserving battery life is a more advantageous consideration than receiving broadcast and multicast frames, a station may be configured to sleep for its listen period without regard to DTIM transmissions. Some conventional powersave techniques may include configurations of the DTIM interval. Lengthening the DTIM interval may allow mobile stations to sleep for longer periods and maximize battery life at the expense of timely delivery. Shorter DTIM intervals may allow quick delivery at the expense of more frequent power-up and power-down cycles. A longer DTIM may thus be used when battery life is critical.

A conventional IEEE 802.11 network may, for example, provide a fixed power save scheme to be used by broadcast and different multicast services. The scheme may, for example, define a fixed listen interval for stations (STAs) or mobile stations in the network. For example, an AP may buffer all the broadcast and multicast traffic and after a specific DTIM beacon frame (e.g., a DTIM may be included in every nth beacon frame) the AP may automatically deliver all the buffered broadcast and multicast traffic. However, different broadcast and multicast services may have very different service characteristics, and thus having only one static scheme in a WLAN level may not provide a desired level of flexibility. Example services may vary from basic services such as ARP or DHCP, which typically have low bit rate (e.g., needing a long listen interval), to different multicast streaming services (e.g., audio, video, etc.) having high bit rate requirements (e.g., needing a shorter listen interval).

However, current fixed schemes may provide only a single bit (e.g., an AID 0 bit in a TIM field) for an AP to indicate the existence of buffered broadcast and/or multicast data. Thus, a receiving STA may not know whether the buffered data is broadcast or multicast, and more particularly the STA may not know whether the buffered data is associated with a multicast service for which STA desires to receive the data.

A transmitter station may be in wireless communication with one or more recipient stations. The transmitter station may, for example, transmit one or more multicast or broadcast streams to one or more recipient stations. For example, a multicast stream may be directed to a group of stations which may be members of a multicast group, and identified by a multicast group address. The transmitter station and recipient station may be any type of stations. For example, the transmitter station may be a base station, access point (AP), wireless station in ad-hoc mode, or other wireless node, while the recipient station may be any type of wireless node.

Although not limited thereto, in an example embodiment, the term broadcast may refer to a transmission of a frame or message to all stations, while multicast may refer to a transmission of a frame or message to a group of stations. The term multicast may generally include a transmission to all stations or to a group or sub-set of stations. Thus, the term multicast may include both multicast and broadcast.

The transmitted message may include, for example, a stream or traffic identifier (TID) associated with recipient station for the multicast stream, multicast group address information which may include the multicast group address for the multicast stream, or a portion or a derivation or a hash of the multicast group address, for example. The message may also include an address of the recipient station that is transmitting the message, such as a medium access control (MAC) address of the recipient station for example.

One or more multicast or broadcast data frames may be transmitted from the transmitter station to a plurality of recipient stations. The multicast data frames transmitted to a recipient station may include a multicast group address and a sequence number, among other fields.

In an example embodiment, mobile multimedia/TV or video applications, may allow multiple stations or nodes to be grouped together to receive a common channel they are watching, e.g., by associating this group of stations watching the channel with a multicast group address. This may allow each of the stations or wireless nodes to receive this TV program or video information via multicast transmission, for example. This is merely one example application, and the various techniques and embodiments described herein may be applied to a wide variety of applications.

In an example embodiment, a wireless node (e.g., AP or station) may determine capabilities of other nodes by receiving a capabilities field in a beacon message or probe response (e.g., from an AP) and via an association request or re-association request (e.g., from a station), for example. An AP may associate with one or more wireless stations or nodes.

Group (e.g., broadcast or multicast) traffic may be classified in two categories: (1) Management plane traffic, to support connectivity, reachability, topology or path discovery (e.g., ARP, DHCP, Netbios), or (2) User Plane Traffic, for example, streaming audio or video.

According to an example embodiment, DTIM beacons may be used to deliver multicast frames to receiving wireless stations. The listen interval or delivery interval may be negotiated with the multicast service setup procedures. According to an example embodiment, broadcast frames may be delivered based on an interval that is an integer multiple of DTIM intervals. For example, if the DTIM interval is 2 then the broadcast interval may be determined to be 4, 6, 8, etc.

For example, if the DTIM interval is 1, then the broadcast interval may be determined as any integer multiple of 1 DTIM interval. For multicast services, the listen interval or delivery interval may be determined to be the same as the broadcast interval or shorter than the interval determined for broadcast services.

A DTIM interval may also define a shortest multicast interval. An AP may advertise the broadcast interval, for example, in beacons. For example, the AP may advertise the broadcast interval and broadcast count similarly as a DTIM interval may be advertised in conventional beacons.

An AP may then: (1) buffer all broadcast frames until a broadcast interval and then send the broadcast frames; (2) buffer data for a specific multicast service until the interval, determined using multicast service setup, for that specific multicast service, and then send the multicast data; and (3) if no specific multicast service intervals are set up, then send multicast data normally after a DTIM or after a broadcast interval.

An enhanced STA may then: (1) wake up every broadcast interval to check and receive potential broadcast data; (2) for multicast services for which specific listen intervals or delivery intervals are negotiated, wake up according to negotiated listen interval or delivery interval and check and receive potential multicast data; and (3) for multicast services for which no specific listen interval or delivery interval is negotiated, wake up every DTIM interval and check and receive potential multicast data or wake up every broadcast interval and check and receive data.

A legacy STA may: (1) wake up every DTIM interval and check and receive potential broadcast or multicast data.

Good flexibility may be achieved if the DTIM interval is set to 1, as different multicast services may be sent on listen intervals or delivery intervals determined as integer multiples of 1; however, the multicast listen interval or delivery interval may easily be selected to be smaller than a broadcast listen interval. The broadcast listen interval may be selected to be large (e.g., 10).

The example techniques discussed herein may advantageously provide legacy compatibility and may provide a transmission technique that aids in minimizing or eliminating transmission of duplicate broadcast and multicast frames.

Figure 6:
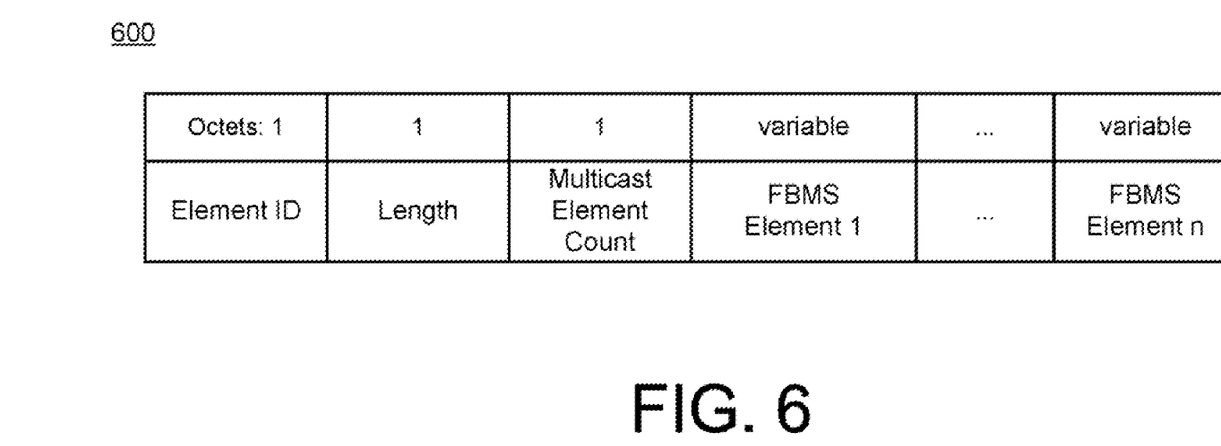
FIG. 6 depicts an example format of a Flexible Broadcast Multicast Service (FBMS) request according to an example embodiment.
Figure 7:
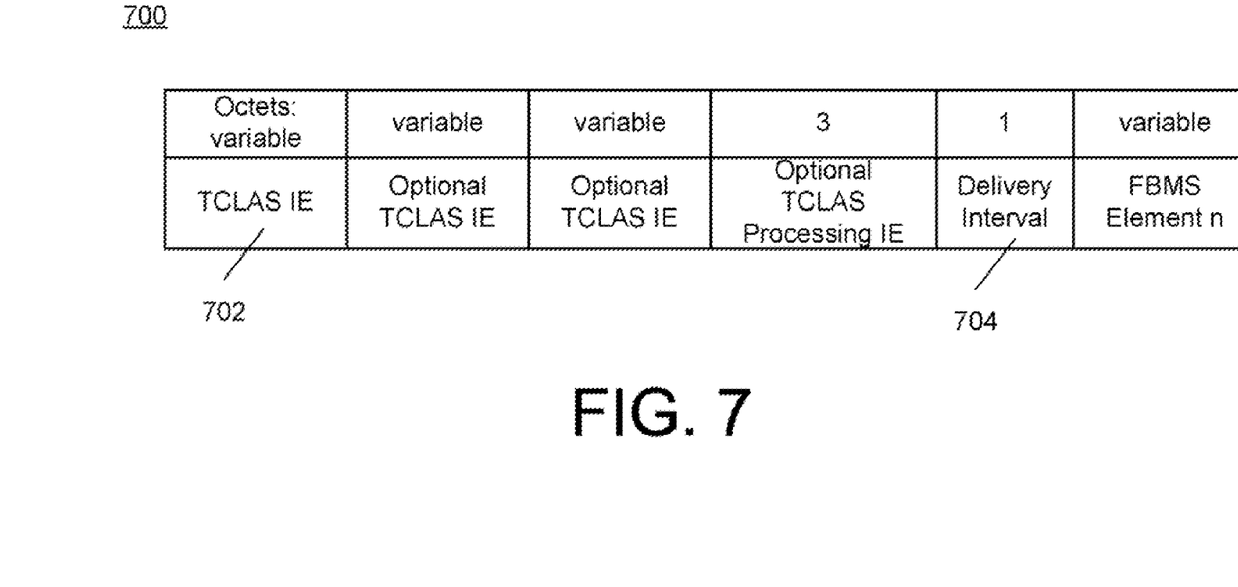
FIG. 7 depicts an example format of a FBMS information element according to an example embodiment.

FIG. 6 depicts an example format of a Flexible Broadcast Multicast Service (FBMS) request 600 according to an example embodiment. As shown, the FBMS request 600 includes one or more FBMS information elements. FIG. 7 depicts an example format of a FBMS information element 700 according to an example embodiment. As shown in FIG. 7, the FBMS information element 700 includes a type classification (TCLAS) IE 702 which may identify L2 or L3 traffic. A delivery interval 704 may specify a number of DTIM intervals for transmitting the traffic. Thus, for example, the STA1 106 may send a FBMS request 700 indicating a requested delivery interval 704 to the AP 104 as discussed previously.

Figure 8:
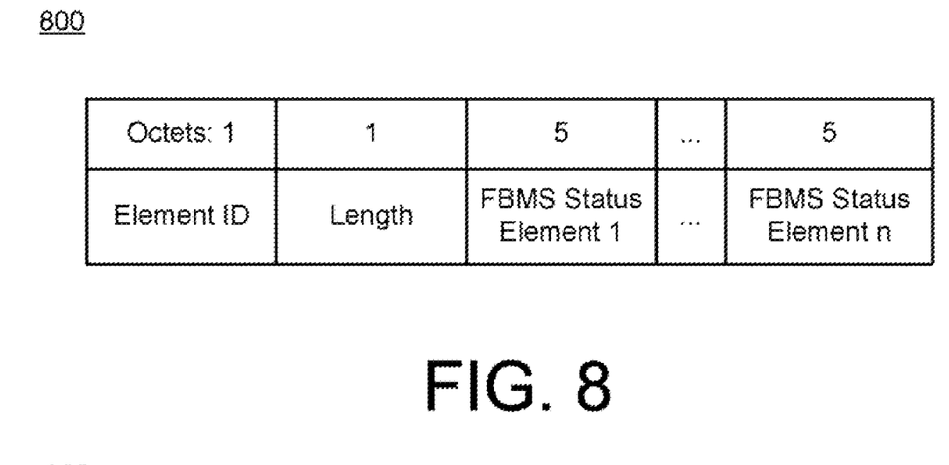
FIG. 8 depicts an example format of a FBMS response according to an example embodiment.
Figure 9:
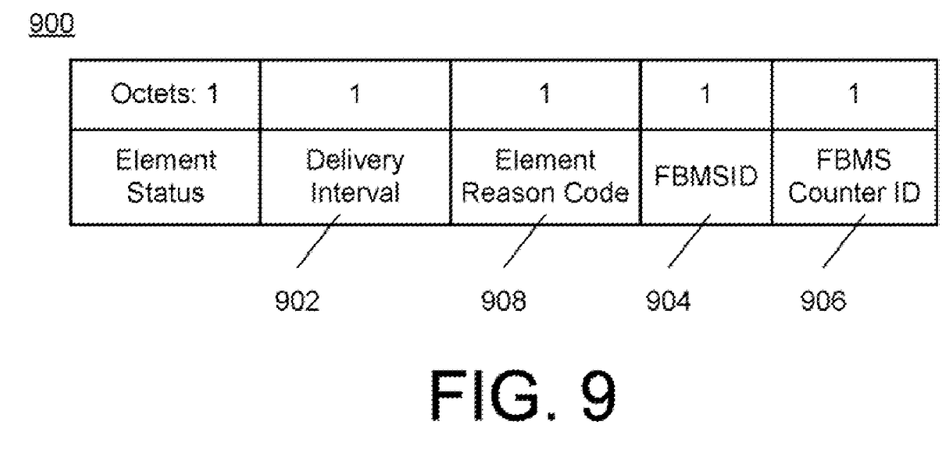
FIG. 9 depicts an example format of a FBMS status element according to an example embodiment.

FIG. 8 depicts an example format of a FBMS response 800 according to an example embodiment. As shown, the FBMS response 800 includes one or more FBMS status elements. FIG. 9 depicts an example format of a FBMS status element 900 according to an example embodiment. As shown in FIG. 9, the FBMS status element 900 includes a delivery interval 902 which may, for example, indicate a number of DTIM intervals for transmitting a stream. A FBMSID 904 may indicate the stream associated with the FBMS element at the AP, for example, the AP 104. An FBMS counter ID 906 may indicate a counter for determining when a time is reached for transmitting the stream associated with the FBMS element. An AP may respond to a FBMS request, for example, with an accept, deny, or override indication. An element reason code 908 may provide indications of reasons for a deny or override indication in the FBMS response 800. For example, a FBMS request may be denied due to lack of resources on the AP to accommodate the request.

Figure 10:
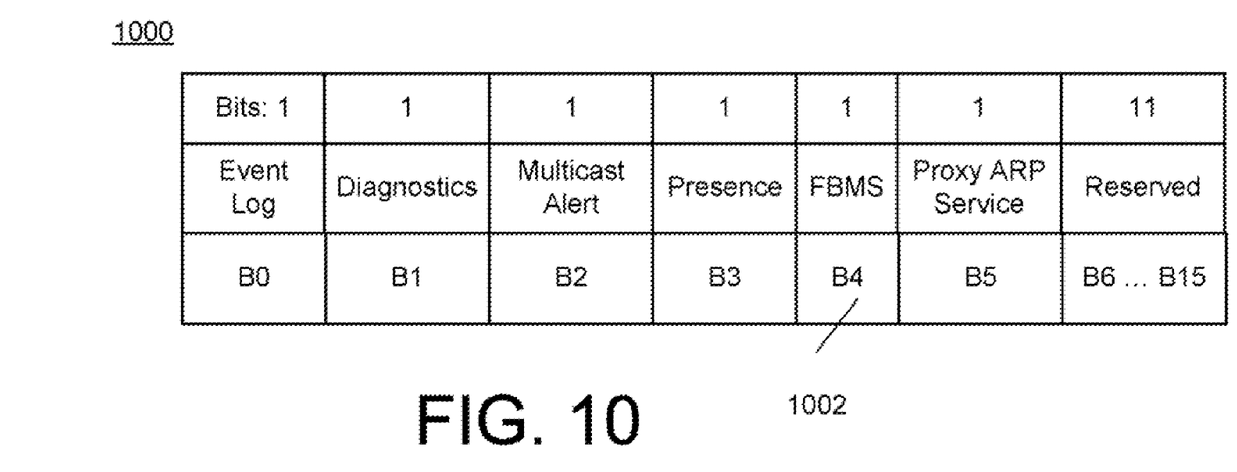
FIG. 10 depicts an example format of a wireless network management capability element according to an example embodiment.

FIG. 10 depicts an example format of a wireless network management capability element 1000 according to an example embodiment. As shown in FIG. 10, the wireless network management capability element 1000 may include a FBMS field 1002 indicating FBMS support for advertising a FBMS capability of a wireless node.

Figure 11:
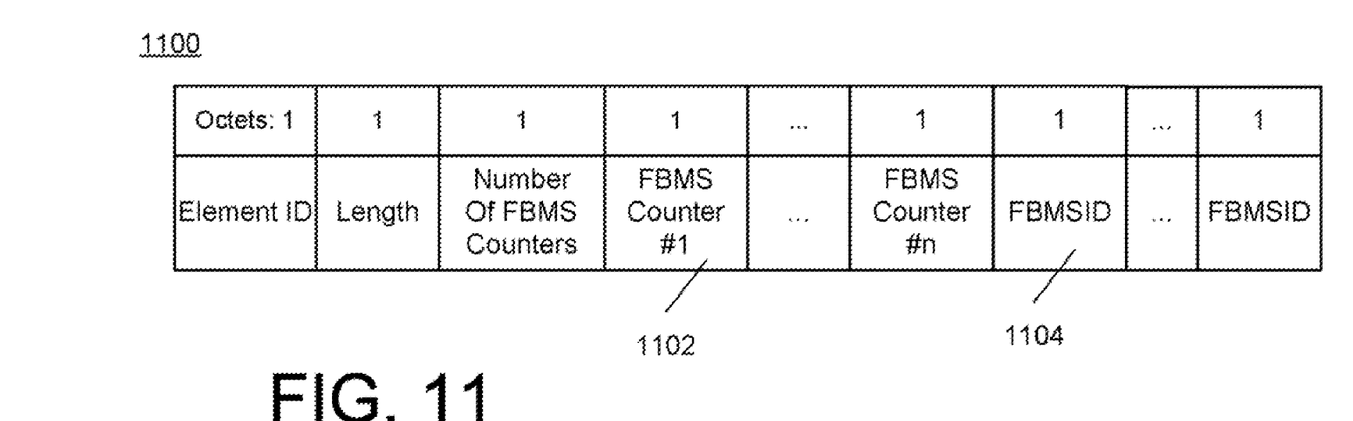
FIG. 11 depicts an example format of an association identifier (AID) 0 information element according to an example embodiment.

FIG. 11 depicts an example format of an association identifier (AID) 0 information element 1100 according to an example embodiment. The association identifier (AID) 0 information element 1100 may be included in beacons, for example, beacons sent by the AP 104 discussed previously. One or more FBMS counters 1102 may be used to count down to zero modulo an interval, for example, a negotiated delivery interval. For example, for an interval having a value of four, the counter may count "3 2 1 0 3 2 1 0 3 2 1 0" continuously, for example, decrementing the counter for every beacon sent. A stream, for example, a broadcast or multicast stream, may be transmitted when the counter value reaches a value of zero. A FBMSID field 1104 may indicate broadcast or multicast services for which frames are currently buffered, and thus may be transmitted when the corresponding counter reaches a value of zero.

An end of service period (EOSP) bit may be set, for example, in a multicast or broadcast frame to indicate whether more buffered frames need to be sent for a particular service. Thus, the techniques discussed herein may provide a minimization of awake time for wireless nodes.

Figure 12:
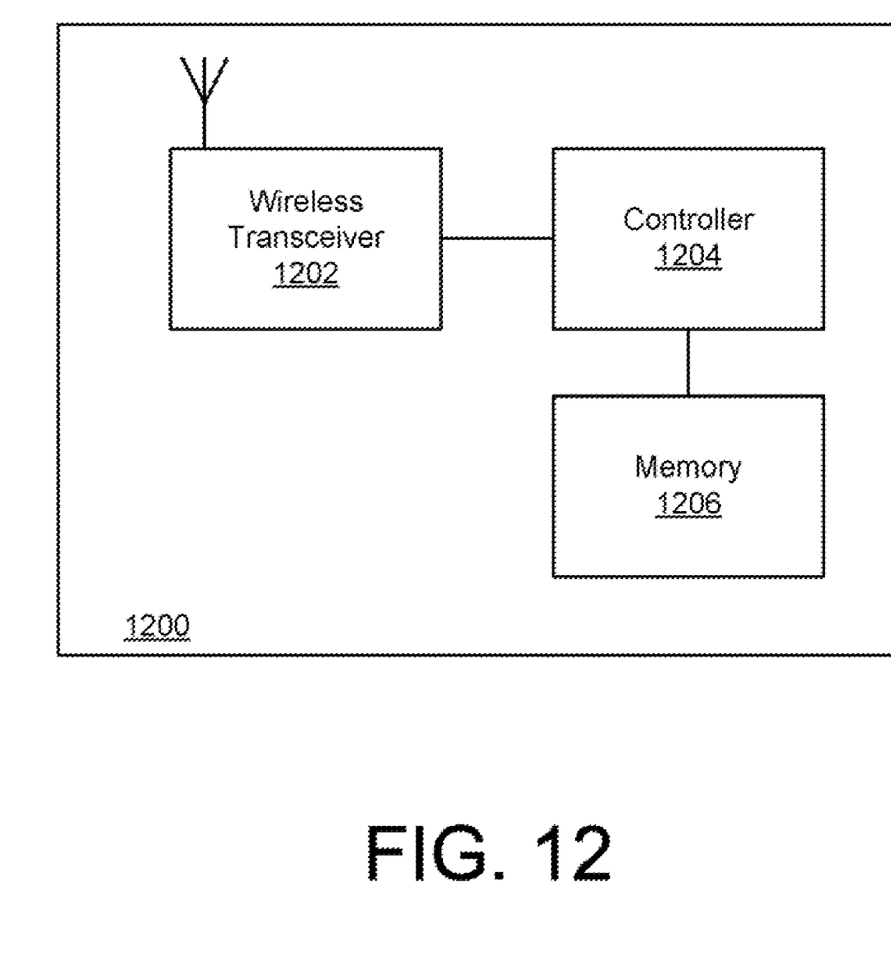
FIG. 12 is a block diagram illustrating an apparatus that may be provided in a wireless station according to an example embodiment.

FIG. 12 is a block diagram illustrating an apparatus 1200 that may be provided in a wireless station according to an example embodiment. The wireless station may include, for example, a wireless transceiver 1202 to transmit and receive signals, a controller 1204 to control operation of the station and execute instructions or software, and a memory 1206 to store data and/or instructions. Controller 1204 may be programmable, and capable of executing software or other instructions stored in memory or on other computer media to perform the various tasks and functions described above. In addition, a storage medium or computer readable medium may be provided that includes stored instructions, that, when executed by a controller or processor, may result in the controller (e.g., the controller 1204) performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or computer readable medium or in a propagated signal, for execution by, or to control the operation of, a data processing apparatus, e.g., a programmable processor or multiple processors, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:
1. A method comprising:
negotiating with a first wireless node a first negotiated delivery interval for a specific multicast service by a transmitting wireless node in a wireless network based on a Delivery Traffic Indication Map (DTIM) interval, and sending information from the transmitting wireless node to the first wireless node based on the first negotiated delivery interval;

wherein the first negotiated delivery interval comprises an integer multiple number of DTIM intervals.

2. The method of claim 1 wherein:
the transmitting wireless node comprises an access point and the first wireless node comprises a station in the wireless network.

3. The method of claim 1 wherein:
the wireless network comprises an 802.11 infrastructure network.

4. The method of claim 1 wherein the negotiating comprises:
receiving an indicator of a first requested interval from the first wireless node.

5. The method of claim 1 wherein the negotiating comprises:
receiving a Flexible Broadcast Multicast Service (FBMS) request including an indicator of a first requested delivery interval from the first wireless node; and
sending a FBMS response including an indicator of the first negotiated delivery interval to the first wireless node.

6. The method of claim 1 wherein the negotiating comprises:
receiving an association request including an indicator of a first requested delivery interval from the first wireless node; and
sending an association response including an indicator of the first negotiated delivery interval to the first wireless node.

7. The method of claim 1 wherein the negotiating comprises:
receiving a reassociation request including an indicator of a first requested delivery interval from the first wireless node; and
sending a reassociation response including an indicator of the first negotiated delivery interval to the first wireless node.

8. The method of claim 1 wherein the sending information from the transmitting wireless node comprises:
sending multicast frames or broadcast frames from the transmitting wireless node to the first wireless node based on the first negotiated delivery interval.

9. The method of claim 1 wherein the sending information from the transmitting wireless node comprises:
sending information from the transmitting wireless node to the first wireless node during the DTIM interval.

10. The method of claim 1 wherein the negotiating includes negotiating the first negotiated delivery interval for the first wireless node by the transmitting wireless node in the wireless network based on the DTIM interval and a multicast service setup operation.

11. A method comprising:
negotiating with a transmitting wireless node a first negotiated delivery interval for a specific multicast service by a first wireless node in a wireless network based on a Delivery Traffic Indication Map (DTIM) interval; and
receiving information from the transmitting wireless node by the first wireless node based on the first negotiated delivery interval;
wherein the first negotiated delivery interval comprises an integer multiple number of DTIM intervals.

12. The method of claim 11 wherein:
the transmitting wireless node comprises an access point and the first wireless node comprises a station in the wireless network.

13. The method of claim 11 wherein the negotiating comprises:
sending a Flexible Broadcast Multicast Service (FBMS) request including an indicator of a first requested delivery interval from the first wireless node; and
receiving a FBMS response including an indicator of the first negotiated delivery interval by the first wireless node.

14. The method of claim 11 wherein the negotiating comprises:
sending an association request including an indicator of a first requested delivery interval from the first wireless node; and
receiving an association response including an indicator of the first negotiated delivery interval by the first wireless node.

15. The method of claim 11 wherein the negotiating comprises:
sending a reassociation request including an indicator of a first requested delivery interval from the first wireless node; and
receiving a reassociation response including an indicator of the first negotiated delivery interval by the first wireless node.

16. The method of claim 11 wherein the receiving information from the transmitting wireless node comprises:
receiving information from the transmitting wireless node by the first wireless node during the DTIM interval.

17. An apparatus for wireless communications, the apparatus comprising:
a controller;
a memory coupled to the controller; and
a wireless transceiver coupled to the controller;
the apparatus configured to:
negotiate with a first wireless node a first negotiated delivery interval for a specific multicast service based on a Delivery Traffic Indication Map (DTIM) interval, and
send information to the first wireless node based on the first negotiated delivery interval;
wherein the first negotiated delivery interval comprises an integer multiple number of DTIM intervals.

18. The apparatus of claim 17 wherein:
the apparatus is configured to negotiate the first negotiated delivery interval based on:
receiving a Flexible Broadcast Multicast Service (FBMS) request including an indicator of a first requested delivery interval from the first wireless node, and
sending a FBMS response including an indicator of the first negotiated delivery interval to the first wireless node.

19. The apparatus of claim 17 wherein:
the apparatus is configured to negotiate the first negotiated delivery interval based on:
receiving an association request including an indicator of a first requested delivery interval from the first wireless node, and
sending an association response including an indicator of the first negotiated delivery interval to the first wireless node.

20. The apparatus of claim 17 wherein:
the apparatus is configured to negotiate the first negotiated delivery interval based on:
- receiving a reassociation request including an indicator of a first requested delivery interval from the first wireless node; and
- sending a reassociation response including an indicator of the first negotiated delivery interval to the first wireless node.

21. An apparatus for wireless communications, the apparatus comprising:
a controller;
a memory coupled to the controller; and
a wireless transceiver coupled to the controller;
the apparatus configured to:
- negotiate with a transmitting wireless node in a wireless network a first negotiated delivery interval for a specific multicast service by a first wireless node in a wireless network based on a Delivery Traffic Indication Map (DTIM) interval, and
- receive information from the transmitting wireless node based on the first negotiated delivery interval;
- wherein the first negotiated delivery interval comprises an integer multiple number of DTIM intervals.

22. The method of claim 10 further comprising:
negotiating a second negotiated delivery interval for a second wireless node by the transmitting wireless node in the wireless network based on the multicast service setup operation; and
sending information from the transmitting wireless node to the second wireless node based on the second negotiated delivery interval.

23. The method of claim 11 wherein the negotiating includes negotiating with the transmitting wireless node the first negotiated delivery interval by the first wireless node in the wireless network based on the DTIM interval and a multicast service setup operation.

* * * * *